April 19, 1938.  D. W. HARRIGAN  2,114,301
PARACHUTE LIFE RAFT PACK
Filed July 24, 1936  5 Sheets-Sheet 1
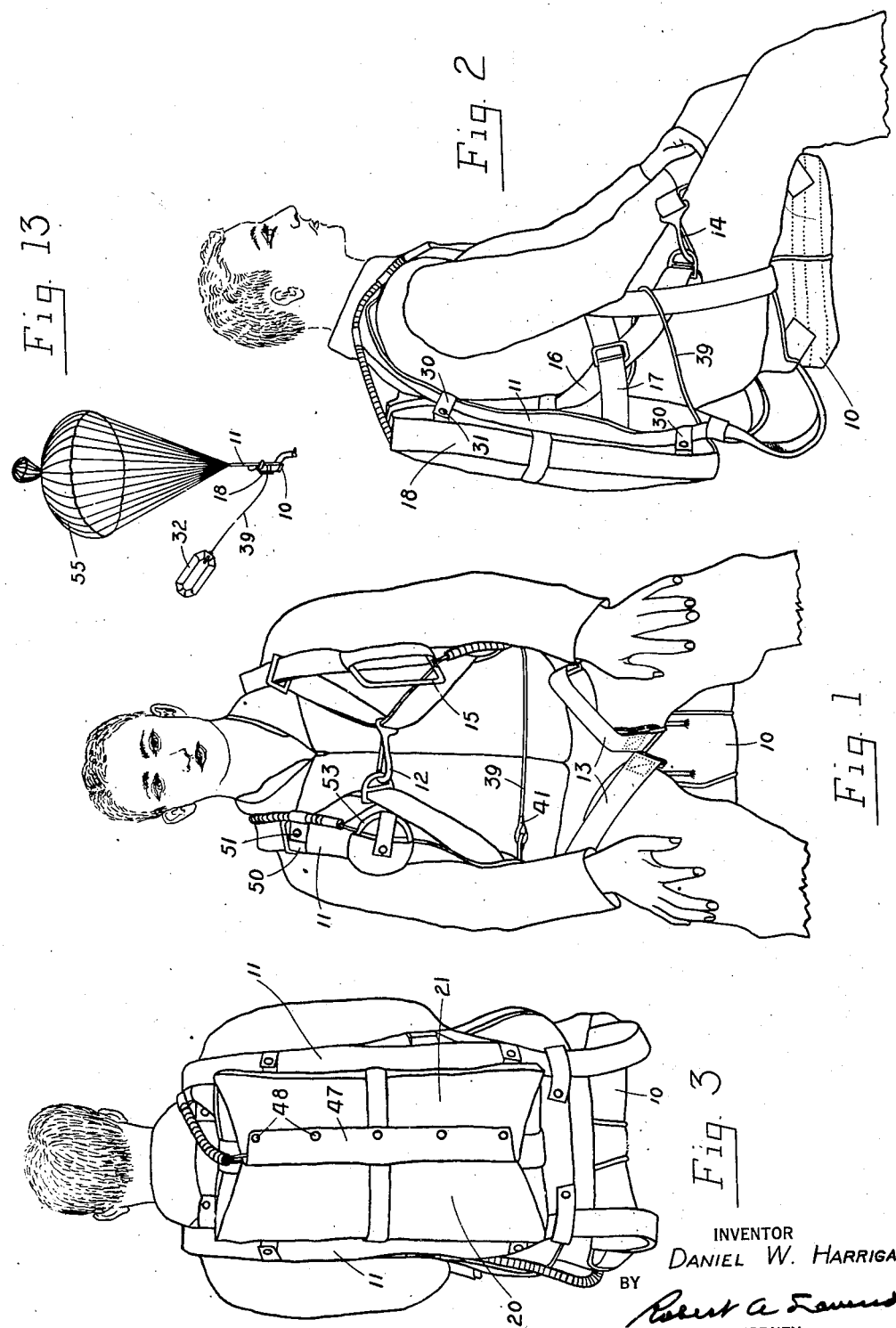
INVENTOR
DANIEL W. HARRIGAN
BY
ATTORNEY April 19, 1938.　　　D. W. HARRIGAN　　　2,114,301
PARACHUTE LIFE RAFT PACK
Filed July 24, 1936　　　5 Sheets-Sheet 2

INVENTOR
DANIEL W. HARRIGAN
BY
ATTORNEY

April 19, 1938.  D. W. HARRIGAN  2,114,301
PARACHUTE LIFE RAFT PACK
Filed July 24, 1936  5 Sheets-Sheet 3
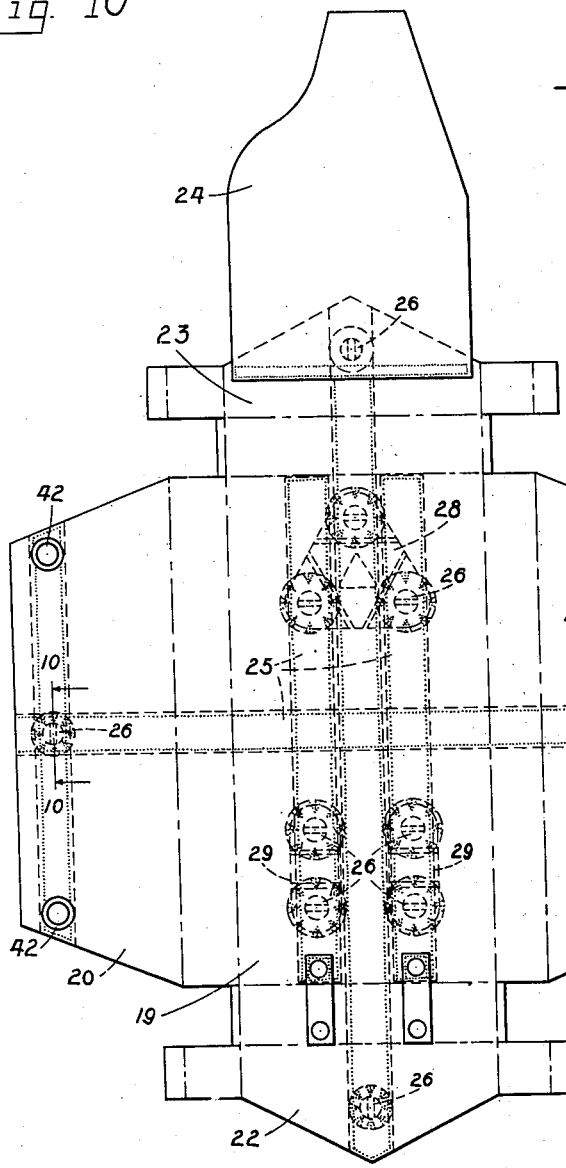

April 19, 1938.  D. W. HARRIGAN  2,114,301
PARACHUTE LIFE RAFT PACK
Filed July 24, 1936  5 Sheets-Sheet 4

INVENTOR
DANIEL W. HARRIGAN
BY
ATTORNEY

INVENTOR
DANIEL W. HARRIGAN
BY
ATTORNEY

Patented Apr. 19, 1938

2,114,301

UNITED STATES PATENT OFFICE 2,114,301

PARACHUTE LIFE RAFT PACK

Daniel W. Harrigan, United States Navy

Application July 24, 1936, Serial No. 92,372

24 Claims. (Cl. 244—148)

(Granted under the act of March 3, 1883, as amended April 30, 1928; 370 O. G. 757)

This invention relates primarily to a parachute life raft, and has for one of its objects to provide a life raft pack that may be readily attached to a standard parachute harness; said raft pack to be worn in flights over water so that in case of an emergency the wearer thereof, after releasing the parachute from the parachute pack or coincidentally therewith, may have means present for supporting himself upon the water.

A further object of this invention is to provide a life raft which may be carried as an accessory, quickly attachable to the parachute harness and thus available for immediate use in an emergency.

A further object of this invention is to provide a life raft that may be released from its pack by the wearer at the appropriate time without interfering with the normal operation of the supporting parachute and when so released, the raft will be automatically self-inflating, but will remain attached to the wearer without, however, interfering with the wearer jumping out of the parachute and harness just before he lands in the water and thus avoid entanglement with and entrapment under the parachute or parachute harness.

A further object of this invention is to provide a life raft so constructed of a brightly colored material, such as a brilliant yellow, to thereby improve the chances of the wearer on the surface of the water with the raft inflated being sighted from the air, not only because of the color of the material but also of the considerably greater area of the raft as compared with the present forms of life jackets.

A further object of this invention is to provide a raft pack that can be released for operation by a rip cord secured to the parachute harness, the rip cord of the raft pack, however, being so distinguished from the rip cord of the parachute by reason of its less accessible location on the right side of the harness opposite the parachute rip cord, that it would be improbable that the wearer would accidentally operate the raft pack rip cord before he had operated the parachute rip cord.

A still further object of this invention is to provide a life raft pack and rip cord that can be attached to a standard parachute seat pack harness without the necessity of any modifications thereof.

A still further object is to provide a life raft pack which may be expeditiously opened by a rip cord and which rip cord, under the preferred arrangement, would likewise actuate or open the valve of a container for the compressed gas.

With the foregoing and other objects in view, this invention comprises the constructions, combinations and arrangement of parts hereinafter claimed, disclosed and illustrated, wherein, Fig. 1 is a front plan view of the parachute life raft of this invention attached to a wearer;

Fig. 2 is a side view of Fig. 1;

Fig. 3 is a back view of Fig. 1;

Fig. 7 is an inside view of the raft pack fully opened out;

Fig. 8 is a plan view of the raft pack rip cord conduit;

Fig. 9 is a view of the raft pack rip cord;

Fig. 10 is a section on line 10—10 of Fig. 7;

Fig. 13 is a diagrammatic view showing the invention in operation;

Figure 5:
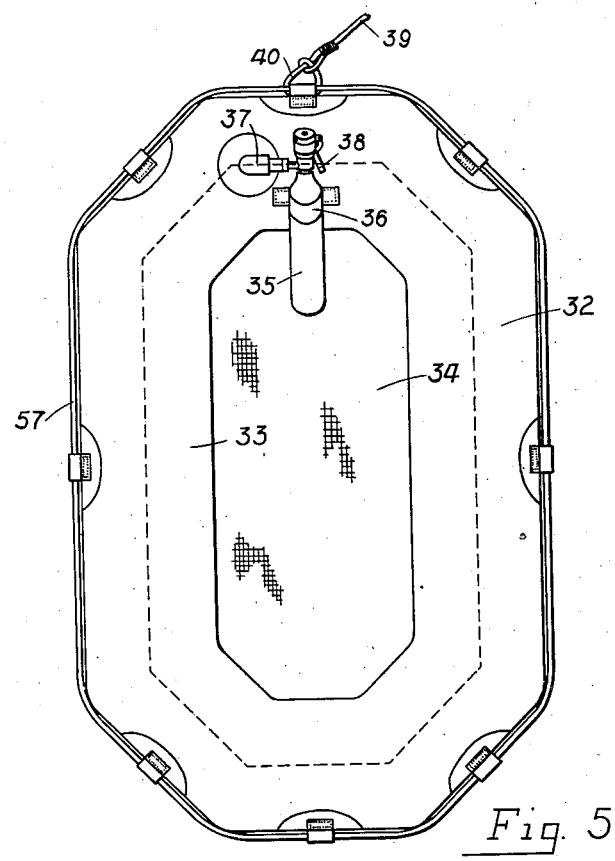
Fig. 5 is a plan view of the life raft opened out.

There is shown at 10 a conventional parachute seat pack in position on a wearer, the pack being attached by means of the usual parachute harness, including the back shoulder straps 11 passing over the wearer's shoulders and having the front attaching snap hook 12, together with the leg straps 13 and attaching snap hooks 14. The usual rip cord handle (ring) 15 is fixed in position for operation by the right hand of the wearer in the customary manner. The snap hooks 14 of the leg straps 13 fasten to the conventional crisscross back straps 16. The usual horizontal back strap 17, which extends over the small of the wearer's back, is likewise present.

This conventional arrangement of back shoulder straps 11, crisscross straps 16, and horizontal cross strap 17 is utilized for securing the raft pack 18 to the wearer. The raft pack 18 includes a sheet 19 of canvas or other suitable material having side flaps 20 and 21 and bottom flap 22, and a top flap 23 to which is attached a bottle protecting extension flap 24. The canvas sheet 19 is provided with a plurality of reinforcing straps 25 sewed thereto. Secured to the sheet 19 and through some of the reinforcing straps are a plurality of male fastening elements 26, these elements 26 being provided with pin receiving apertures 27. There are seven of these fastening elements 26 located as shown in Fig. 7, three of them being in triangular outline at the top of the reinforcing straps 25 to cooperate with the crisscross back straps 16, and the remaining four being located in rectangular outline at the bottom of the reinforcing straps 25 to cooperate with the horizontal cross strap 17. A triangular shaped bridge plate 28 provided with an aperture at each corner thereof is adapted to fit over the criss-cross back straps 16 and detachably hold the sheet 19 by means of the male elements 26 extending through the apertures, and is held in position thereon by cotter pins extending through the apertures 27 in the elements 26,—Fig. 10. The lower portion of the sheet 19 is detachably held to the horizontal cross strap 17 by means of a pair of vertical bridge plates 29 which fit over the lower male elements 26 and are similarly secured thereto by cotter pins. It will be seen that by thus utilizing these bridge plates 28 and 29, this type of raft pack 18 may be attached to any conventional seat pack harness.

For further securing the raft pack 18 in position, a plurality of securing straps 30 extend from the outside of the pack sheet 19 and are adapted to be fastened about the back straps 11 by means of snap fasteners 31.

Figure 6:
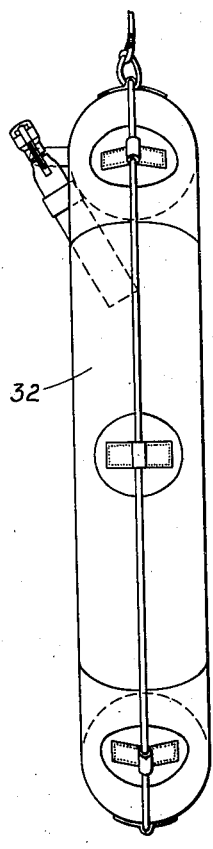
Fig. 6 is a side view of Fig. 5.
Figure 4:
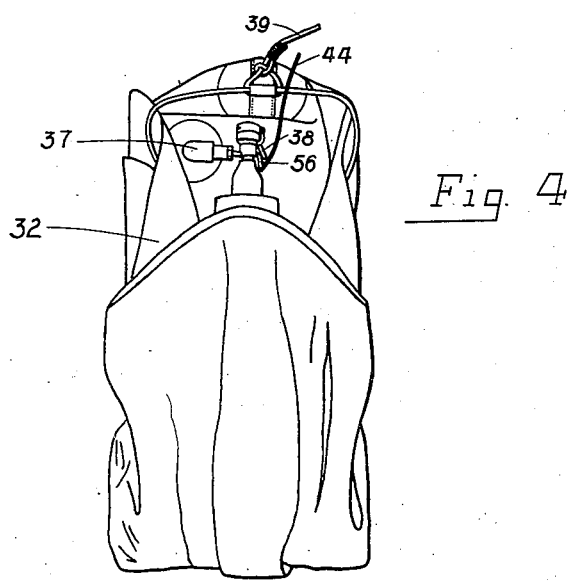
Fig. 4 is a view of the life raft ready to be placed in the pack.

The life raft to be utilized with this pack is shown at 32 in Figs. 4, 5 and 6, and consists of an inflatable tube 33 carrying a raft floor 34 and a pocket 36 for holding a carbon dioxide bottle 35 attached to a raft inflating valve 37, operable by a valve trip 38. The tube 33 has the usual hand rope 57 secured thereabout and a painter 39 is fastened at one end 40 thereto. The other end of the painter 39 ends in a snap fastener 41, so that it may be secured about the waist of the wearer, as shown in Figs. 1 and 2, it being observed that this painter 39 extends completely beneath the parachute harness so that when the harness is discarded by unfastening snap hooks 14 and 12 in the customary manner just before the wearer alights, the raft is left attached to the wearer, free of the harness.

The raft 32 is folded up to the position shown in Fig. 4 and placed within the raft pack 18 against the sheet 19. The top and bottom flaps 23 and 22 are then folded thereover, the extension flap 24 being placed in position to protect the raft from chafing by the bottle 35, each of the flaps 22 and 23 carrying a male fastening element 26. The side flap 20 is then folded over the folded top flap 23 and bottom flap 22, the grommets 42 in the flap 20 being placed over these male fastening elements 26 on flaps 22 and 23, the flap 20 itself carrying a male fastening element 26 which is now in alignment with the elements 26 in flaps 22 and 23. Next the flap 21 is folded over, bringing its grommets 43 over and onto the three fastening elements 26. Before this is done, however, valve trip actuator 56 of extension cord 44 on the raft pack rip cord 45 is placed in position against the bottle valve trip 38. Then, when the flap 21 is in proper position the pins 46 are each inserted through the apertures 27 of the male fastening elements 26, thus holding the pack 18 in the closed position, and placing the raft 32 under a slight or moderate degree of compression so that when the pins 46 are withdrawn the pack 18 is released and the expansion of the raft 32 to relieve itself from the compressive action will tend to clear the pack 18 from the raft 32 and leave the latter free. An extension flap 47 extending from the flap 21 is then folded back over the protruding ends of the male fastening elements 26 and held in position by snap fasteners 48, preventing accidental withdrawal or crimping of the pins.

The rip cord 45 extends through the rip cord conduit 49, the rip cord conduit 49 being held to the right shoulder strap 11 by the small straps 50 and snap fasteners 51, a pocket 52 being provided at the end of the conduit 49 for receiving the rip cord handle 53 and holding it therein by means of the snap fastener flap 54. This snap fastener flap 54 not only serves to hold the raft rip cord handle 53 in position, but also serves to positively identify to the wearer that it is the life raft rip cord, and thus insure against accidental use of this rip cord 53 before the parachute handle 15 is utilized for releasing the parachute 55 in the seat pack 10.

Figure 16:
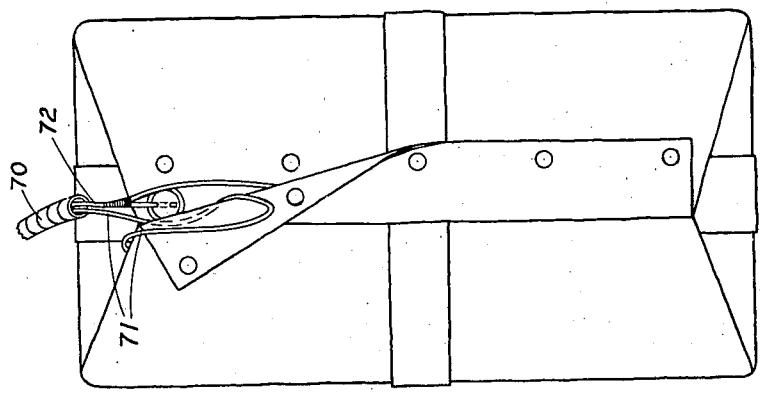
Fig. 16 is an enlarged view of the raft pack cover partially opened to disclose the slack loop provided in the life raft rip cord to ensure the complete actuation of the parachute rip cord prior to the actuation of the life raft rip cord.
Figure 15:
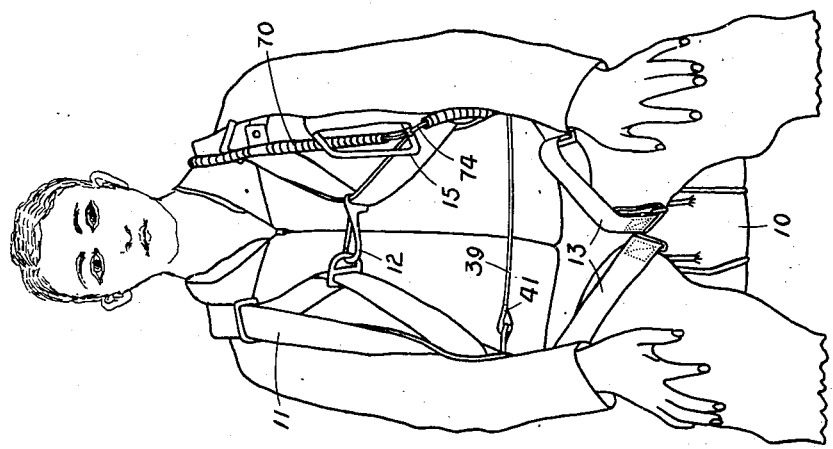
Fig. 15 is a view of Fig. 1, showing a single rip cord handle to which are attached both the parachute and the life raft rip cords.
Figure 14:
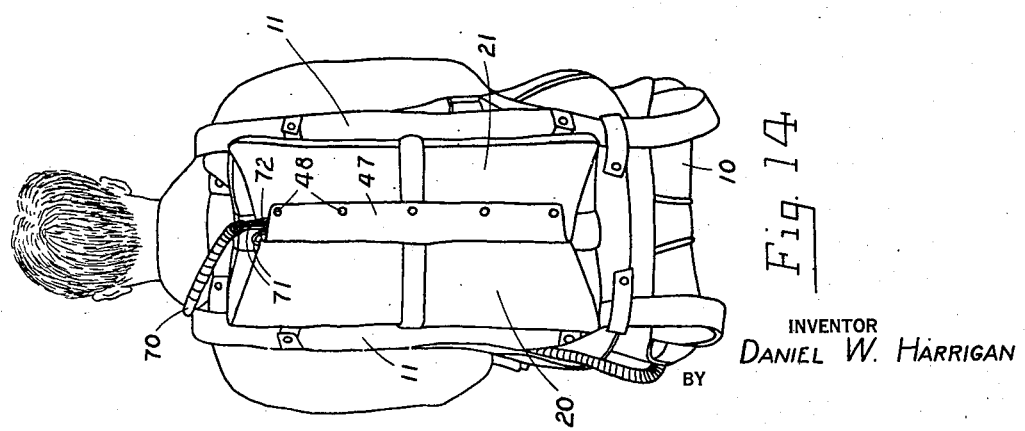
Fig. 14 is a view of Fig. 3 showing the alternate arrangement of the life raft rip cord conduit to enable the wearer to actuate both rip cords by one pull of the single rip cord handle.

An optional form of the invention is shown in Figs. 14, 15 and 16, similar in all respects to the foregoing except that the life raft rip cord, 45, ring 53, and rip cord conduit 49 are replaced by a rip cord conduit 70 led over the wearer's left shoulder, flask valve trip cord 71, and life raft pack rip cord 72. In Fig. 16 is shown a slack loop in both the flask valve trip cord and the raft pack rip cord. In Fig. 15 is shown the single rip cord handle 15 to which is joined the life raft rip cord 73 at the junction point 74 of the rip cord handle and the parachute rip cord. This arrangement of parachute rip cord and life raft rip cord 73 packed with a slack loop 71, both attached to a single rip cord handle 15 will serve to enable the wearer to open the parachute 55, the life raft pack 21, and the life raft 32, in that order; and will prevent the possibility of a confused wearer opening the life raft pack 21 prior to the opening of the parachute 55 with a possible subsequent fouling of the two, by virtue of the fact that a short pull of the rip cord handle will release the parachute, whereas an appreciably longer pull will be necessitated to remove the slack in the loops 71 and 72 before the life raft pack 21 and flask valve trip 38 will be opened by the life raft rip cord 73.

Figures 11, 12:
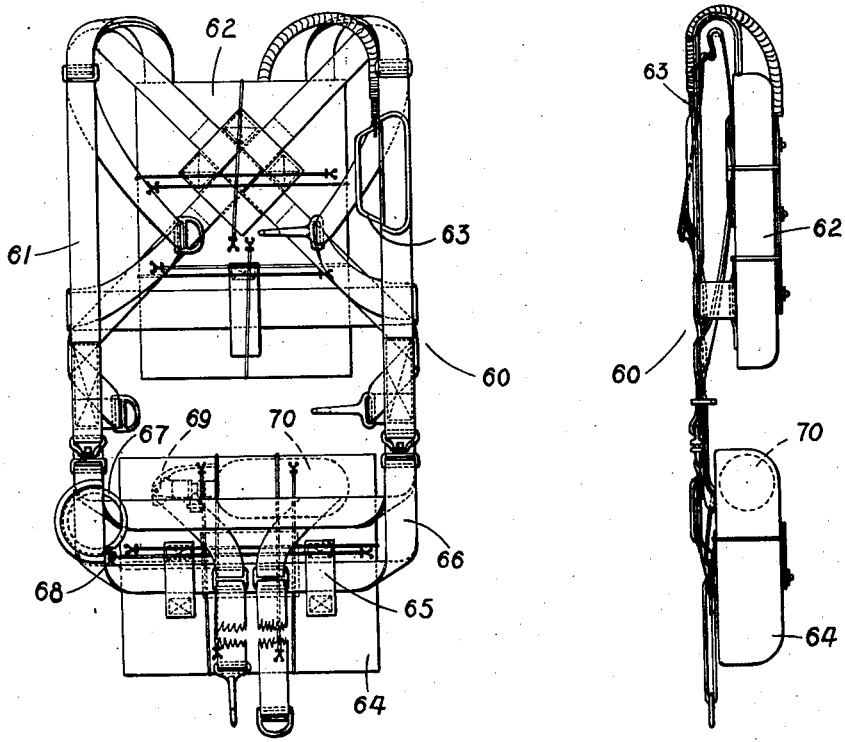
Fig. 11 is plan view of a modified form of the invention with a raft seat pack and a parachute back pack.
Fig. 12 is a side view of Fig. 11.

There is shown in Figs. 11 and 12 an optional form of the invention, which utilizes the conventional parachute harness. In said figures, a conventional back pack 62 carries the usual parachute which can be released by the rip cord as above described, the cord and handle (ring) in this instance being denoted generally by 63. A raft pack 64 is secured by straps 65 to the seat strap 66 of the parachute harness, which latter is denoted by 61. This raft pack 64 is provided with a rip cord ring as 67, attached to the rip cord 68, which, when pulled, opens the raft pack and releases the contained raft, and at the same time actuates or opens the flask valve 69 of the compressed gas bottle 70, permitting the gas to pass therefrom to inflate the raft.

While the life raft pack has been described for use in conjunction with a parachute pack and its harness, it is evident that the life raft pack may be otherwise employed. Thus, for instance, it may be carried upon planes, disconnected entirely from any parachute apparatus or harness, or carried aboard air or surface ships with a view of being thrown overboard for use. In other words, insofar as the generic invention is concerned, I believe that a life raft pack which may be opened by a rip cord or similar means and which cord may be utilized to actuate or release the valve of the bottle or container for compressed gas, employed to inflate the raft, is new. I do not, therefore, desire to limit myself to the combination of such a structure when attached to a parachute harness, or in fact any other means or elements.

The terms "life raft pack" and "parachute pack" as they appear in the claims are to be given a broad interpretation unless by reason of the terminology of such claims they relate to a specific form of such pack or packs.

This invention may be manufactured and used by or for the Government of the United States of America for governmental purposes without the payment of any royalties thereon or therefor.

I claim:

1. In combination, a parachute pack; a life raft pack; and a rip cord common to both of said packs.

2. In combination, a parachute pack and harness and a life raft pack secured to said harness, an inflatable life raft within said life raft pack, a life raft inflating bottle, and a rip cord for opening said life raft pack.

3. In combination, a parachute pack and harness and a life raft pack secured to said harness, an inflatable life raft within said life raft pack, a raft inflating bottle, and a rip cord for opening said life raft pack and operating said bottle to inflate said raft.

4. In combination, a parachute pack, rip cord and harness, a life raft pack and rip cord attachable to said harness, said life raft rip cord being distinguishable from the parachute rip cord, and means for attaching said life raft pack to the parachute harness comprising a plurality of harness embracing fastening members.

5. In combination, a parachute pack, rip cord and harness; a life raft pack and rip cord attachable to said harness, said life raft pack rip cord being distinguishable from the parachute rip cord; and means for attaching said life raft pack to the parachute harness comprising a plurality of harness embracing fastening members, some of said members comprising apertured bridging plates and fastener elements insertable through the apertures in said bridging plates to secure the parachute harness under said bridging plates.

6. In combination, a parachute pack, rip cord and harness, a life raft pack and rip cord attachable to said harness, said life raft rip cord being distinguishable from the parachute rip cord, and means for attaching said life raft pack to the parachute harness comprising a plurality of harness embracing fastening members, some of said fastening members comprising a plurality of straps extending from the raft pack and raft pack rip cord, and snap fastener means at the end of said plurality of straps for attachably securing said straps to said parachute harness.

7. In combination, a parachute pack, rip cord and harness, a life raft pack and rip cord attachable to said harness, said life raft pack rip cord being distinguishable from the parachute pack rip cord, and means for attaching said life raft pack to the parachute harness comprising a plurality of harness embracing fastening members, some of said members comprising apertured bridging plates and fastener elements insertable through the apertures in said bridging plates to secure the parachute harness under said bridging plates, other of said fastening members comprising a plurality of straps extending from the raft pack and raft pack rip cord and snap fastener means at the end of said plurality of straps for attachably securing said straps to said parachute harness.

8. In combination, a parachute pack, rip cord and harness, a life raft pack adapted to be secured to said harness, an inflatable life raft and an inflating bottle within said life raft, and a raft pack rip cord, distinguishable from the parachute pack rip cord, for opening said life raft pack and automatically actuating said inflating bottle to inflate said life raft.

9. In combination, a parachute pack, rip cord and harness, a life raft pack adapted to said harness, an inflatable life raft and an inflating bottle within said life raft pack, and a raft pack rip cord, distinguishable from the parachute pack rip cord, for opening said life raft pack and automatically actuating said inflating bottle to inflate said life raft, and a painter secured to said life raft and attachable to the body of the wearer.

10. In combination with a parachute pack, a life raft pack and means for detachably securing said last named pack to the harness of the parachute pack, each of said packs being provided with its own rip cord, such rip cord being so positioned with reference to the harness as to be readily distinguishable by the user.

11. A structure as set forth in claim 10, wherein the life raft pack contains a life raft having a painter secured thereto and extending outside of said pack, so that the free end thereof may be secured to the body of the user free of the parachute pack.

12. In combination with a parachute pack and its harness; a life raft pack; a life raft in the latter; a container carrying a fluid under compression for inflating the raft; means for detachably securing said life raft pack to the parachute pack harness; and a rip cord for releasing said life raft and simultaneously opening the container, whereby the life raft will be inflated.

13. In combination with a self-inflatable life raft, means for inflating said life raft, a pack for said raft enclosing the same, and a rip cord connected to said pack and said inflating means for opening said pack and initiating the inflation of said self-inflatable raft.

14. In combination with an inflatable life raft, a valved container or bottle for compressed gas and designed when opened to release its contents to inflate the raft; a pack for said raft enclosing the same; and a rip cord for said pack, said cord being so arranged with reference to the pack and the valve of the bottle or container that as the pack is ripped to open the same to release the raft, the valve is likewise opened and the raft inflated.

15. In combination with a self-inflatable life raft, a pack therefor comprising sheet material adapted to be folded about the raft when it is in a collapsed condition; means for securing the folded portions of said pack in position about said raft at a plurality of points; means for inflating said raft while within said sheet material to cause the raft to emerge therefrom, and means under the control of the user for releasing said securing means and initiating the inflation of said self-inflatable raft.

16. A structure as set forth in claim 15, wherein the raft has attached thereto a bottle or container for compressed gas; the releasing means comprising a valve secured thereto and leading to the inflatable portion of the raft; and a rip cord for the pack.

17. A structure as set forth in claim 15, wherein the raft has attached thereto a bottle or container for compressed gas; the releasing means comprising a valve secured thereto and leading to the inflatable portion of the raft; and a rip cord for the pack, said cord being associated with the valve trip whereby the raft will be released from its pack and the valve simultaneously opened upon actuation of the rip cord.

18. A raft pack comprising in combination an inflatable raft; a bottle for compressed gas attached to the inflatable portion of the raft; a pack for the raft, said pack comprising a main body portion and outwardly extending flaps adapted to be folded over and about the raft when the latter is in a collapsed condition; means for securing the flaps to the main body portion when in their folded raft enclosing position; and a rip cord for releasing said securing means.

19. A structure as set forth in claim 18, wherein at least one flap when infolded overlies and protects the bottle.

20. In combination, a parachute pack, rip cord and harness, a life raft pack and rip cord therefor attachable to said harness, and means for attaching said life raft pack to the harness comprising a plurality of harness embracing fastening members.

21. A life raft pack, a floatable life raft within said pack, means within said pack for inflating said life raft, means for detachably securing said life raft pack to the harness of a parachute pack, said parachute pack having a rip cord and a rip cord handle, and a rip cord and a rip cord handle operatively connected to said life raft pack for opening said life raft pack and to said inflating means for initiating the operation of said raft inflating means, said life raft rip cord handle being distinguishable from said parachute pack rip cord handle.

22. A life raft pack, a floatable life raft within said pack, means within said pack for inflating said life raft, means for detachably securing said life raft pack to the harness of a parachute pack, said parachute pack having a rip cord and a rip cord handle, and a rip cord and a rip cord handle operatively connected to said life raft pack for opening said life raft pack and to said inflating means for initiating the operation of said raft inflating means.

23. A life raft pack, a floatable life raft within said pack, means within said pack for inflating said life raft, means for detachably securing said life raft pack to the harness of a parachute pack, said parachute pack having a rip cord and a rip cord handle, and a rip cord and a rip cord handle operatively connected to said life raft pack for opening said life raft pack and to said inflating means for initiating the operation of said raft inflating means, said life raft pack being a back pack.

24. A life raft pack, a floatable life raft within said pack, means within said pack for inflating said life raft, means for detachably securing said life raft to the harness of a parachute pack, said parachute pack having a rip cord and a rip cord handle, and a rip cord and a rip cord handle operatively connected to said life raft pack for opening said life raft pack and to said inflating means for initiating the operation of said raft inflating means, said life raft pack being a seat pack.

DANIEL W. HARRIGAN.